US010565554B2

(12) United States Patent
Jones et al.

(10) Patent No.: US 10,565,554 B2
(45) Date of Patent: Feb. 18, 2020

(54) METHODS AND SYSTEMS FOR MONITORING A RETAIL SHOPPING FACILITY (71) Applicant: Walmart Apollo, LLC, Bentonville, AR (US)

(72) Inventors: Nicholaus A. Jones, Fayetteville, AR (US); Robert J. Taylor, Rogers, AR (US); Aaron J. Vasgaard, Rogers, AR (US); Matthew A. Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 314 days.

(21) Appl. No.: 15/585,317

(22) Filed: May 3, 2017

(65) Prior Publication Data
US 2017/0357939 A1    Dec. 14, 2017

Related U.S. Application Data (60) Provisional application No. 62/348,488, filed on Jun. 10, 2016.

(51) Int. Cl.
*G06Q 10/08*      (2012.01)
*G06K 9/00*       (2006.01)
(Continued)

(52) U.S. Cl.
CPC ..... *G06Q 10/0875* (2013.01); *G06K 9/00671* (2013.01); *G06K 9/00791* (2013.01);
(Continued)

(58) Field of Classification Search
CPC ........... G06Q 10/0875; G06Q 30/0633; G06K 9/00671; G06K 9/00791; G06K 9/6202;
(Continued)

(56) References Cited

U.S. PATENT DOCUMENTS 5,821,512 A    10/1998  O'Hagan
6,052,692 A     4/2000  Anderson
(Continued)

FOREIGN PATENT DOCUMENTS

CN    204250118     4/2015
JP    2007058759    3/2007
(Continued)

OTHER PUBLICATIONS

Chandrasekar, P. et al; "Smart Shopping Cart with Automatic Billing System through RFID and ZigBee;" Information Communication and Embedded Systems; 2014; pp. 1-4.
(Continued)

*Primary Examiner* — John R Schnurr
(74) *Attorney, Agent, or Firm* — Fitch, Even, Tabin & Flannery LLP (57) ABSTRACT In some embodiments, apparatuses and methods are provided herein useful for a retail shopping facility to maintain stocked shelves, in part, from obtaining images of the store shelves via cameras mounted onto shopping carts. By one approach, the images obtained from the shopping carts are compared with planogram images to determine where retail products are needed to restock the shelves. In some examples, the shopping cart has a control circuit that determines when to capture electronic images based, in part, upon a sensor mounted onto the shopping cart, instructs the camera to capture the electric image, and stores the captured electronic image in the memory.

17 Claims, 6 Drawing Sheets (51) Int. Cl.
  *G06K 9/62* (2006.01)
  *G06Q 30/06* (2012.01)
  *H02K 7/18* (2006.01)
  *H04N 5/232* (2006.01)
(52) U.S. Cl.
  CPC ....... *G06K 9/6202* (2013.01); *G06Q 30/0633* (2013.01); *H02K 7/1846* (2013.01); *H04N 5/23241* (2013.01)
(58) Field of Classification Search
  CPC ... H02K 7/1846; H04N 5/232; H04N 5/23241
  See application file for complete search history.

(56) References Cited

U.S. PATENT DOCUMENTS

| | | | |
|---|---|---|---|
| 6,218,796 | B1 | 4/2001 | Kozlowski |
| 7,693,757 | B2 | 4/2010 | Zimmerman |
| 7,944,354 | B2 | 5/2011 | Kangas |
| 8,429,004 | B2 * | 4/2013 | Hamilton ........... G06Q 10/0639 705/7.41 |
| 8,630,924 | B2 | 1/2014 | Groenevelt |
| 9,064,161 | B1 * | 6/2015 | Boman .................... G06K 7/01 |
| 9,135,491 | B2 | 9/2015 | Morandi |
| 9,152,149 | B1 | 10/2015 | Palamarchuk |
| 9,247,211 | B2 | 1/2016 | Zhang |
| 2004/0186813 | A1 | 9/2004 | Tedesco |
| 2006/0210115 | A1 | 9/2006 | Nemet |
| 2007/0129849 | A1 | 6/2007 | Zini |
| 2009/0192921 | A1 * | 7/2009 | Hicks ................... G06F 3/0312 705/28 |
| 2009/0240590 | A1 * | 9/2009 | Or ......................... G06Q 30/02 705/14.58 |
| 2009/0265671 | A1 | 10/2009 | Sachs |
| 2010/0121807 | A1 | 5/2010 | Perrier |
| 2012/0217080 | A1 | 8/2012 | Besler |
| 2012/0296751 | A1 | 11/2012 | Napper |
| 2013/0056330 | A1 | 3/2013 | Chierego |
| 2013/0137449 | A1 | 5/2013 | Kuo |
| 2014/0002646 | A1 | 1/2014 | Scheffer |
| 2014/0270747 | A1 | 9/2014 | Maltese |
| 2015/0029339 | A1 | 1/2015 | Kobres |
| 2015/0095189 | A1 | 4/2015 | Dharssi |
| 2015/0381870 | A1 | 12/2015 | Weng |
| 2016/0082937 | A1 | 3/2016 | Nakaoka |

FOREIGN PATENT DOCUMENTS

| | | |
|---|---|---|
| WO | 2008029159 | 3/2008 |
| WO | 2015150622 | 10/2015 |
| WO | 2016055815 | 4/2016 |

OTHER PUBLICATIONS

PCT App. No. PCT/US17/31018; International Search Report & Written Opinion dated Aug. 7, 2017; pp. 1-22.
PCT; App. No. PCT/US17/36114; International Search Report and Written Opinion dated Aug. 25, 2017; pp. 1-21.
Chandrasekar, P. et al; "Smart Shopping Cart with Automatic Billing System through RFID and ZigBee;" Information Communication and Embedded Systems; 2014; pp. 1-4 (Year:2014).

* cited by examiner

METHODS AND SYSTEMS FOR MONITORING A RETAIL SHOPPING FACILITY

CROSS-REFERENCE TO RELATED APPLICATION

This application claims the benefit of U.S. Provisional Application No. 62/348,488, filed Jun. 10, 2016, which is incorporated herein by reference in its entirety.

TECHNICAL FIELD

This invention relates generally to monitoring retail items at a retail shopping facility.

BACKGROUND

As a convenience to shoppers, many retail facilities offer shopping carts that customers can use while they are shopping within the facility. These shopping carts generally have a basket portion, a handle, and wheels such that the shopping carts can easily be moved around a retail shopping facility as users fill the shopping cart with various items they intend to purchase. Further, modern retail environments often look for ways to further improve the customer experience, such as by providing convenient, ready access to retail products or items. To that end, a retail shopping facility may find it advantageous to make locating products of interest easier for customers and having the products readily available on the store shelves.

BRIEF DESCRIPTION OF THE DRAWINGS

Disclosed herein are embodiments of systems, apparatuses and methods pertaining to maintaining a database of item locations, in part, from cart path information obtained from cameras in shopping carts. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to determine when and where particular shelves within a physical retail shopping facility need restocking, to maintain the integrity of the shelf displays, and to track the location of retail items within a retail shopping facility by taking images of the retail shelves. While the provision of powerful cameras, such as high quality video cameras, throughout the retail shopping facility may prove expensive and bulky, the systems, apparatuses, and methods outlined below obtain images efficiently and selectively.

Accordingly, the systems, apparatuses and methods include a shopping cart with a cart frame having cart wheels coupled to the cart frame, an image capturing assembly, and a control circuit. The image capturing assembly, by one approach, includes an electronic image capturing device (which may include a camera) that is capable of capturing images of store shelves, which may be used to detect or indicate a stock level of retail items within a retail shopping facility. In addition, the image capturing device may include a memory configured to store captured electronic images until they are transferred to a central computer, a sensor configured to measure cart conditions effecting image quality of the electronic images captured by the electronic image capturing device, and a power storage device configured to store electrical energy sufficient to periodically capture electronic images and store at least some of the electronic images.

In one embodiment, the shopping cart includes a control circuit operably coupled to the electronic image capturing device and configured to determine when to capture the electronic images based, in part, on information from one or more sensors thereon, instruct the electric image capturing device to capture an electronic image, and store the captured electronic image in the memory. At the central computer, the captured images may be compared with planogram images that depict the facility shelves when fully stocked. Further, in one configuration, the information from the comparison of the images and the planogram may be compared to the purchased items identified at the point of sale terminals or registers. If the captured images are compared to planogram images or earlier images of the store shelves (such as at store opening), along with the particular store sales data, the system may identify likely product theft. Further, analyzing the image timestamps may help identify when the stolen products were lifted or pulled from the shelves.

By one approach, the electronic image capturing device is a camera mounted onto a portion of a cart handle. In one illustrative embodiment, the camera is mounted at the edge of the cart handle. The electronic image capturing device also may include multiple cameras, which may be mounted on opposite sides of the shopping cart.

In one illustrative configuration, the control circuit is configured to transfer the electronic images to the central computer. To that end, the shopping cart may include, for example, a wireless transceiver to transfer some of the electronic images to the central computer. In another configuration, the shopping cart may include a wired connection configured to transfer electronic images. For example, the cart may connect to a port at a cart corral or a point of sale terminal.

In one embodiment, the sensor may include a proximity sensor configured to determine a current location of the cart frame relative to one of the shelves within the retail shopping facility. In this manner, the proximity sensor may indicate that the focal length of the camera lens is within the proper range to ensure a sufficiently high quality image be taken by the electronic image capturing device. In another embodiment, the sensor may include an accelerometer configured to determine cart movement. In this manner, the accelerometer helps determine whether the cart is moving at a speed conducive to capturing a sufficiently high quality image by the on-board electronic image capturing device. In yet another embodiment, the sensor includes a wheel power generator assembly coupled to at least one of the plurality of cart wheels. As used herein, the wheel power generator assembly is configured to convert kinetic energy from a rotation of a cart wheel to electrical energy. When the wheel power generator is generating over a certain predetermined amount of energy, the cart is typically moving too fast for a sufficiently high quality to be captured by the electronic image capturing device.

Accordingly, the control circuit is typically configured to instruct the electronic image capturing device to capture the electronic images when readings from the sensor(s) are within a predetermined range to thereby ensure that the electronic images obtained are of sufficiently high quality. In this manner, the electronic capturing device is not wasting energy obtaining pictures that will not be usable to analyze the retail stock levels, integrity of the shelf displays, and the location of retail items in the retail shopping facility.

Similarly, the control circuit is typically configured to instruct the electronic image capturing device to capture electronic images when a predetermined amount of time and/or space has passed since a previous electronic image was captured. In this manner, the control circuit is not capturing extra images or images of the same retail shelves, but instead, the images are selectively captured so as not to include redundant images.

In yet another configuration, to ensure quality images that are readable and provide pertinent information, the control circuit may be configured to capture the electronic image when the proximity to the cart shelves is within the proper range and other cart conditions are met. For example, the control circuit may obtain an electronic image when the accelerometer indicates that the shopping cart is moving below a certain speed and the proximity sensor indicates that the cart frame is within a predetermined distance from one of the shelves. In another example, the control circuit may obtain an electronic image when the accelerometer indicates that the shopping cart apparatus is not moving and the proximity sensor indicates that the cart frame is within a predetermined distance from one of the shelves. In still yet another example, the control circuit may obtain an electronic image when the wheel power generator assembly is generating power below a certain amount and the proximity sensor indicates that the cart frame is within a predetermined distance from one of the shelves. Finally, the control circuit may obtain an electronic image when the wheel power generator assembly is not generating power and the proximity sensor indicates that the cart frame is within a predetermined distance from one of the shelves.

In one configuration, the proximity sensor is disposed at a lower portion of the cart frame, such as adjacent the wheels. In another configuration, the proximity sensor is disposed at the cart handle. If the proximity sensor is disposed in or around the cart handle, the proximity sensor may be focused downward. While retail shelves may be moved upward or downward depending on the size and/or shape of the retail items disposed thereon, the base of a retail shelf is typically a constant (or nearly constant) height, and therefore, measuring the cart distance from the base of the shelf may provide more accurate information about the distance of the shopping cart from the retail shelves.

As noted above, the image capturing assembly may include a power storage device. In one approach, the power storage device is charged by, for example, a wheel power generator assembly coupled to a cart wheel, a direct electrical connection between the shopping cart apparatus and a cart corral or a point of sale terminal, and an electrical connection between the shopping cart apparatus and a charging pad, such as at a point of sale terminal or cart corral. Further, a direct electrical connection between the shopping cart apparatus and the cart corral may include, for example, at a wire brush connection, a cart extension contact or one of the cart wheels extending within a track, and a plug-in connection, among others.

A shopping cart apparatus, as described, herein may include a cart frame with a plurality of cart wheels coupled to a lower portion thereof and an image capturing assembly. By one approach, the image capturing device may include an electronic image capturing device that is configured to capture electronic images of shelves within a retail shopping facility, one or more sensors configured to measure cart conditions effecting quality of the electronic images, and a portable electronic device configured to be operably coupled to the electronic image capturing device and the sensor. As used herein, the portable electronic device may be configured to determine when to capture the electronic images based, in part, on information from one or more sensors, instruct the electronic image capturing device to capture the electronic images, and store the electronic image. By one approach, the portable electronic device may include, for example, a smartphone or another handheld personal device. Further, the portable electronic device typically has battery power and transmission capabilities. In another aspect, the portable electronic device is mountable to the cart frame.

In one embodiment, the shopping system also may include an associate electronic device that is in communication with the central computer and any database. The associate may receive information from the central computer and indicate that certain areas of the retail shopping facility need restocking or other maintenance, such as moving the retail items to another location or addressing a problem indicated in one of the electronic images.

In operation, the shopping cart may be brought to the point of sale terminal for checkout, the captured electronic images, in one approach, are communicated or transferred from the image capturing device and/or a memory associated therewith to the central computer, point of sale terminal, or another device in communication therewith. After communicating or transferring the images, the image capturing device or memory associated therewith can be cleared such that the shopping cart may be used by another shopper. By one approach, the image capturing device is configured to clear the recorded electronic images after the central computer has received the images therefrom.

In addition to providing information about the stock levels of retail products and the integrity of the store shelves, aisles, layout, or planogram, an aisle/shelf location may be of interest when analyzing consumer behaviors within the retail shopping facility. Thus, a store may be interested in the aisles visited by a customer and the time spent at various aisle locations. In operation, the data obtained from the cameras may be analyzed over time to determine the shopping patterns of each aisle or each customer, which can be used to determine (or anticipate) when items should be placed on a shelf or restocked. In addition, the retail shopping facility may be interested in where the purchased items were retrieved or produced from in the retail shopping facility. Thus, the methods described herein also may include estimating a time spent at particular locations within the store based on timestamps of the images captured or identifying from where retail products were retrieved. As noted, these teachings may be used, in part, to identify the aisle and/or shelf location where particular retail products are retrieved. To that end, U.S. Patent Application No. 62/323,700 filed May 6, 2016 is incorporated herein in its entirety.

As discussed further below, the images captured may be relatively low resolution images that do not require significant amounts of power or memory to capture and store. Despite the potential lower resolution quality of the images, the information obtained from these images can be used in a multitude of manners. In addition to tracking stock levels, maintaining shelf integrity, and monitoring product location (s), the data obtained from the cart-mounted cameras also may be used to monitor price compliance. In this manner, the system analyzes the price labels that are displayed on the shelf to ensure that the proper price is posted. It also can be used to see how the price label affects how quickly products are moved from the shelf. In addition, the data obtained from the cart-mounted cameras may be used to ensure modular integrity. For example, the system may analyze the order (and other display aspects) of the items on the store shelves. The captured images also may be analyzed to determine the available shelving materials, such as the available wood shelving, located in a particular retail facility or area of the store. In this manner, the system can determine whether the correct shelving assets are available in the facility for future modular or shelf plans.

As used herein, the shopping carts may include baskets with wheels, flatbed carts, and movable item containers, among others that are moved around a retail shopping facility or location. One illustrative embodiment includes a handle portion that is generally configured to be grasped or held by a user when the shopping cart is pushed or pulled.

The retail shopping facility may be any type of shopping facility or location in which products are displayed, for sale, and/or distributed at numerous points around the facility such that the customer travels through the space to retrieve desired products. Further, the facility may be any of a number of sizes or formats and may include products from one or more merchants. For example, a facility may be a single store operated by one merchant or may be a collection of stores covering multiple merchants such as a mall.

To efficiently and economically capture images of retail shelves and the products (or lack of products) thereon, a lightweight image capturing assembly may be incorporated into shopping carts that capture images of shelves as the shopping carts are advanced through the store by shoppers. By one approach, the method includes coupling an image capturing assembly having an electronic image capturing device and a sensor to measure cart conditions to a shopping cart, capturing a first electronic image with the electronic image capturing device and storing the electronic image, sensing the cart conditions to determine whether cart speed and location are suitable for capturing electronic images, determining whether sufficient time and/or distance have lapsed since the first electronic image is captured, and capturing a second electronic image if sufficient time and/or distance have lapsed and if cart conditions are suitable for capturing electronic images. Prudent use of memory storage and power permit use of lightweight components that do not add bulk to shopping carts.

To avoid incorporating a bulky battery onboard the shopping cart, one or more of the cart wheels may be configured to generate power with a wheel power generator assembly configured to convert kinetic energy from a rotation of the cart wheel(s) to electrical energy.

In another configuration, the battery may remain relatively modest by having the battery frequently charged. To that end the method may include powering the electronic image capturing assembly, in part, by charging a battery via a direct electrical connection between the shopping cart and a cart corral or point of sale terminal, and an electrical connection between the shopping cart and a charging pad at a cart corral or point of sale terminal. In this manner, the battery may be charged in between uses of the shopping carts by different customer. Also, the battery may be charged during use, such as via a wheel power generator assembly coupled to one of the plurality of cart wheels.

Further, to economically use the power provided on the shopping cart, the control circuit may sense the cart conditions prior to capturing images to ensure that the image(s) will be high quality. Accordingly, the method also may include determining whether the accelerometer indicates that the shopping cart is moving below a certain speed and whether the wheel power generator is generating below a certain amount of power.

Figure 1:
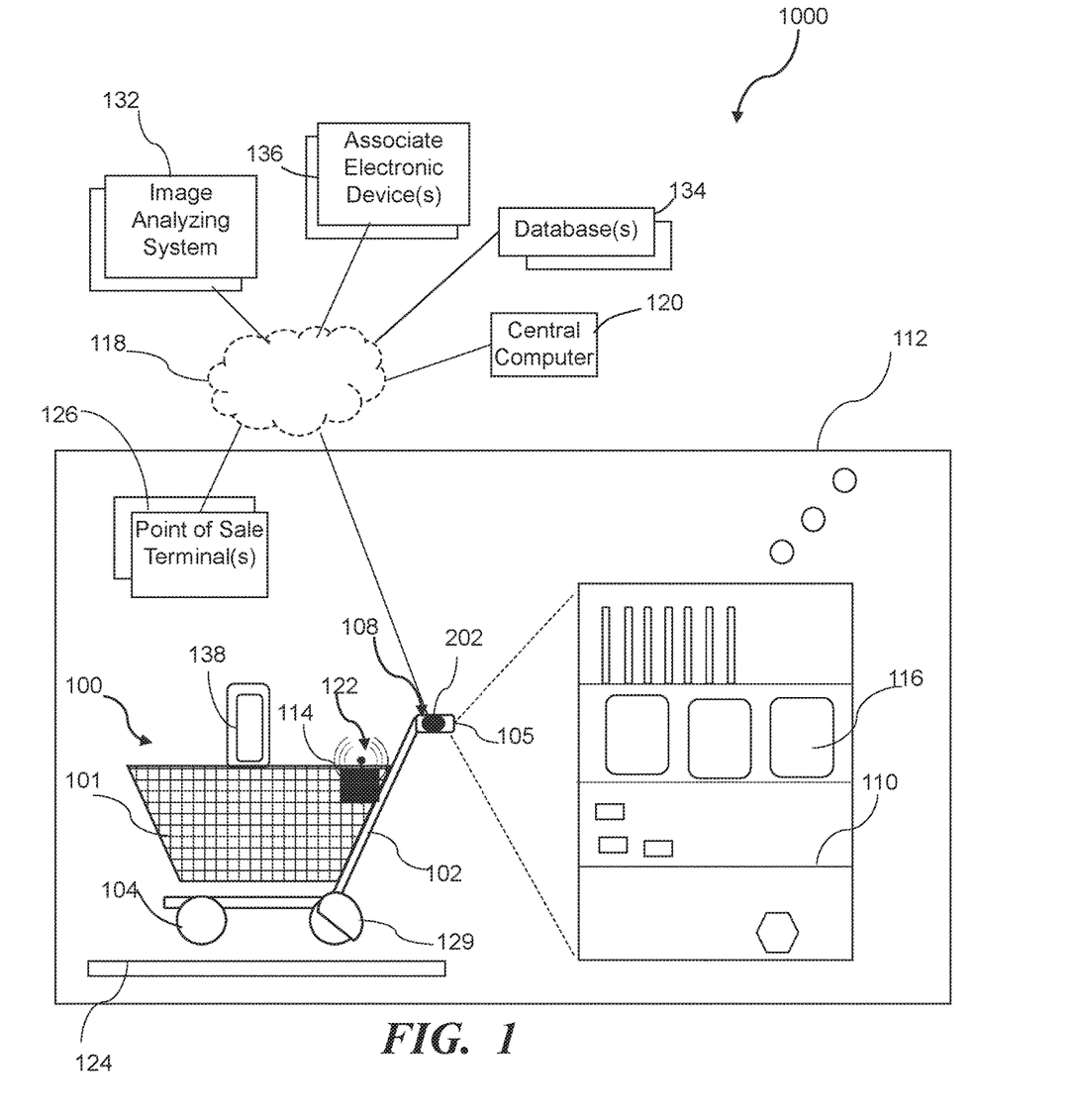
FIG. 1 is a simplified block diagram of an exemplary shopping system in accordance with some embodiments.

FIG. 1 illustrates a simplified block diagram of an exemplary stock detection or display system 1000, according to some embodiments, which facilitates capturing electronic images via a shopping cart and transferring those images to a central computer, which may then compare the images to a planogram, analyze changes in the images over time, or analyze empty spots in the images. In this way, the retail shopping facility may determine where the retail shelves need to be restocked in the retail shopping facility 112 and how closely the actual retail shelves correspond to the intended planogram.

Figure 2:
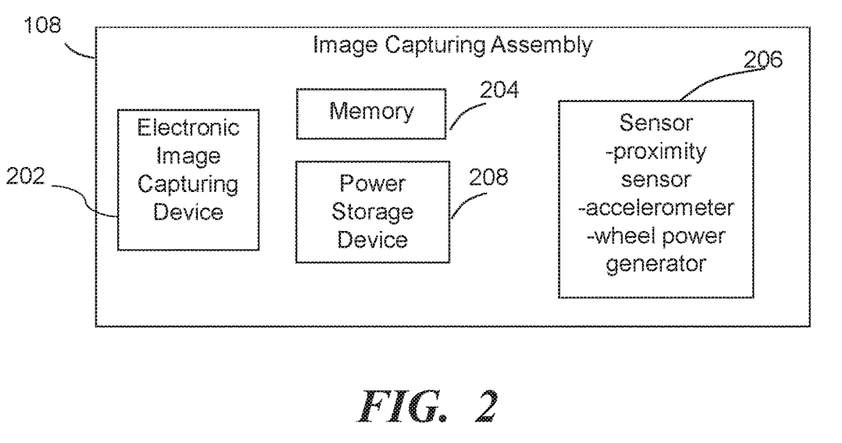
FIG. 2 is a schematic block diagram of a portion of an exemplary shopping system in accordance with some embodiments.

The shopping cart apparatus 100, in one approach, includes a cart frame 102 with wheels 104 coupled thereto, and image capturing assembly 108, and a control circuit 114. In one example, the image capturing assembly 108, as illustrated in FIG. 2, includes an electronic image capturing device 202, a memory 204 configured to store at least some of the electronic images taken with the electronic image capturing device until the electronic images are transferred to a central computer 120 (FIG. 1), a sensor 206 (such as a proximity sensor, accelerometer, or wheel power generator) configured to measure cart conditions effecting the image quality of the electronic images, and a power storage device 208 configured to store electronical energy sufficient to periodically capture electronic images and store some of the images.

By one approach, the electronic image capturing device 202 is coupled to the cart frame 102 and configured to capture electronic images of shelves within a retail shopping facility 112. These electronic images may then be used to indicate a stock level of retail items within the retail shopping facility and when the shelves need to be restocked. By one approach, the image capturing device 202 is a low resolution camera that does not require significant amounts of power or memory to store the captured images. As discussed below, the captured low-resolution images can undergo post-processing analysis (e.g., contrast enhancement or dynamic range reduction) to help deduce the stock levels or procure relevant information. In addition, the image capturing device 202 may be a low power device to avoid requiring a large in-cart battery as mentioned above.

In one embodiment, the control circuit 114 is coupled to the electronic image capturing device 202, the memory 204, the sensor 206, and the power storage device 208. Further, the control circuit 114 may determine when to capture the electronic images based, in part, on information from the sensor 206, instruct the electronic image capturing device 202 to capture an electronic images, and store the captured electronic image in the memory 204.

In addition, the electronic images may be provided to the control circuit or central computer 120 either directly or indirectly, such as through a network 118. In some configurations, the network 118 also may communication information to a headquarters location that maintains information on store displays or shelves and a planogram that provides an intended or master floor plan and/or aisle location destinations for particular retail items.

As illustrated in FIG. 1, the image capturing assembly 108, the point of sale terminal(s) 126, the central computer 120, the image analyzing system 132, the associate electronic device(s) 136, and the database(s) 134, if present, may be communicatively coupled, either directly or indirectly, such as over one or more distributed communication networks 118, which may include, for example, LAN, WAN, Internet, cellular, Wi-Fi, and other such communication networks or combinations of two or more of such networks.

The central computer 120 may store electronic images captured via the shopping cart in an image database 134. Further, the central computer and/or the image analyzing system 132 may analyze the captured electronic images and compare these images to planogram images in the image database 134 or other shopping cart images stored in the image database 134.

To facilitate the transfer of the electronic images to the central computer 120, the shopping cart may include a wireless transceiver 122. Such wireless transmission may occur, for example, via Bluetooth transceivers, low power transceivers such as a Bluetooth lower energy transceiver, RF transceivers, and Wi-Fi. In another embodiment, the transfer of the electronic images may occur via a wired connection. In this manner, the wired connection may transfer the electronic images at a cart corral 130 or a point of sale terminal 126. For example, the cart and corral may include a wire brush, a track that the cart wheels may advance into, or a plug-in connector.

The shopping cart apparatus 100 typically includes a frame 102, a basket 101 into which retail items may be placed, wheels 104 that facilitate movement of the shopping cart apparatus 100 around the retail shopping facility 112. The shopping cart apparatus 100 also includes a cart handle 105 that is graspable by a user or customer. In addition, the shopping cart apparatus 100 may include other convention components not shown in FIG. 1, such as a child seat, a swinging rear door, a divider, etc. Given the electrical elements mounted onto the shopping cart apparatus 100, the frame 102 may further include wiring thereon (such as wiring on an upright rail), or, alternatively may have wiring built into the frame 102 itself. In another configuration, the wiring may be very minimal, such as if the image capturing assembly includes a small battery contained in the cart handle.

As mentioned above, the shopping cart apparatus 100 includes at least one sensor 206. By one approach, the sensor 206 is a proximity sensor configured to determine a current location of the cart frame relative to one of the shelves within the retail shopping facility. The proximity sensor may help determine if the focal length of the electronic image capturing device is sufficient to ensure a quality image.

In another embodiment, the sensor 206 includes an accelerometer configured to detect cart movement. In addition to detecting whether the cart is moving too fast to properly capture an image, the accelerometer may indicate whether a sufficient distance has passed since the previous image was captured. In yet another embodiment, the sensor 206 may be a wheel power generator assembly 129 coupled to one of the cart wheels 104 and configured to convert kinetic energy from a rotation of the cart wheels to electronical energy.

In operation, the control circuit 114 may instruct the electronic image capturing device to capture the electronic images when readings from the sensor 206 are within a predetermined range and a predetermined amount of time and/or space has passed since a previous electronic image was captured. In another configuration, the control circuit 114 captures the electronic image when the proximity sensor indicates that the shopping cart or cart frame is within a predetermined distance from the shelf and other cart conditions are within a predetermined range. For example, the electronic image may be taken if the accelerometer indicates that the shopping cart apparatus is moving below a certain speed, the accelerometer indicates that the shopping cart apparatus is not moving, the wheel power generator assembly is generating power below a certain amount, and/or the wheel power generator assembly is not generating power.

By one approach, the proximity sensor is disposed at a lower portion of the cart frame. The proximity sensor, if disposed near a cart wheel or axle, is likely adjacent the lowest shelf in an aisle, and this lowest shelf is typically at a consistent distance from the floor. Also, the lowest shelf in an aisle of shelves, may have a front or base plate to keep things from rolling thereunder. This front or base plate is typically disposed at a consistent location along an aisle of shelves such that it can be used to consistently determine the footprint location of the shelves, whereas the individual shelves themselves may be moved upward or downward depending on the size or shape of the items disposed thereon.

By another approach, the proximity sensor is disposed in or around the cart handle 105. In that manner, the proximity sensor may be focused downward. As noted above, the consistency of the footing or base of the shelf provides a helpful benchmark for gauging the distance of the aisle shelves form the shopping cart.

As suggested above, the sensor 206 may include a wheel power generator assembly 129 coupled to at least one of the plurality of cart wheels. Further, the wheel power generator assembly 129 may include any device configured to convert kinetic energy from a rotation of the cart wheel to electrical energy.

In one illustrative approach, the power generator assembly 129 comprises a generator coupled to one of the wheels 104, such as the back wheel, and a battery or capacitor element coupled to the generator and configured to store the electrical energy generated by the generator. In some embodiments a shopping cart may capture energy from being pushed around the retail shopping facility, and store the energy in a capacitor or battery for use in the capturing of images via the electronic image capturing device.

As used herein, the power generator assembly 129 may include, for example, a stator element and a rotator element for generating energy from the rotation of the wheel(s). Generally, the rotation of the wheel may cause the relative motion between the stator element and the rotator element of the generator 129. In some embodiments, the generator may comprise lap and/or wave winding.

Figure 4:
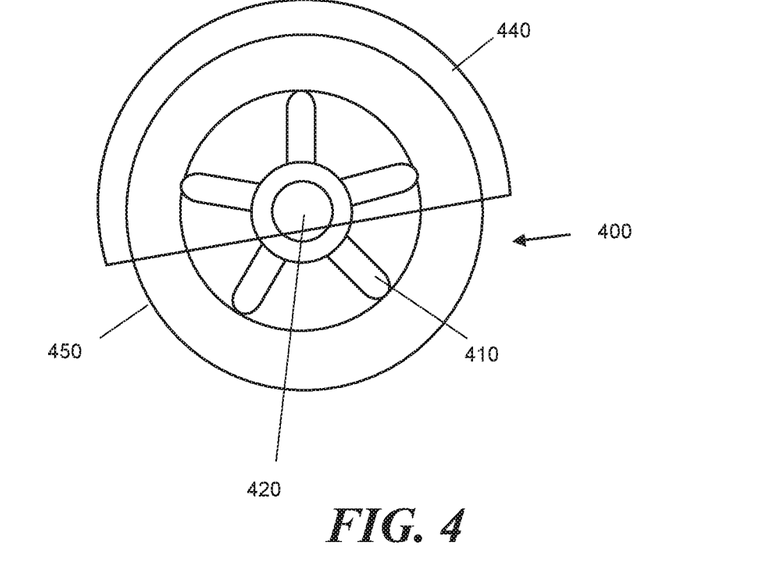
FIG. 4 is an illustration of a shopping cart wheel in accordance with some embodiments.

Referring now to FIG. 4, a wheel 400 of a shopping cart according to some embodiments is shown. The wheel assembly 400 includes a wheel 450, an axle 420, and a covering 440. In some embodiments, the wheel assembly 400 may include the generator 129 described with reference to FIG. 1. In some embodiments, a stator element of the generator may be included within the covering 440 of the wheel 450 and a rotator element 410 may be included in the wheel 450. In some embodiments, a stator element of the generator may be included in the axle 420 to generator energy with the rotator element 410 in the wheel 450. In some embodiments, the stator element(s) may comprise field poles. In some embodiments, the rotator element 410 may comprise one or more cores with lap or wave winding. In some embodiments, the winding may be winded around the axle 420. In some embodiments, the winding may wind around cores that extend away from the center of the wheel 450. Generally, a generator is configured to convert the kinetic energy of the rotation of the wheel 450 into electrical energy. In some embodiments, the generator may comprise any conventional electrical energy generator types such as one or more of a direct current power generator, a docking station alternating current power generator, a homopolar generator, an induction generator, a linear electric generator, etc.

In one embodiment, the shopping cart apparatus 100 includes a cart handle 105 coupled to the cart frame 102 and the electric image capturing device 202 coupled to the cart handle 105. In one illustrative embodiment, the shopping cart apparatus 100 includes one electronic image capturing device 202, which may be disposed adjacent an end of a cart handle 105. In another embodiment, the shopping cart apparatus 100 may include two image capturing devices 202, with each end of the handle 105 having an image capturing device 202 disposed therein. By one approach, the image capturing device(s) 202 may be contained in a cap at the end of the cart handle.

Figure 6:
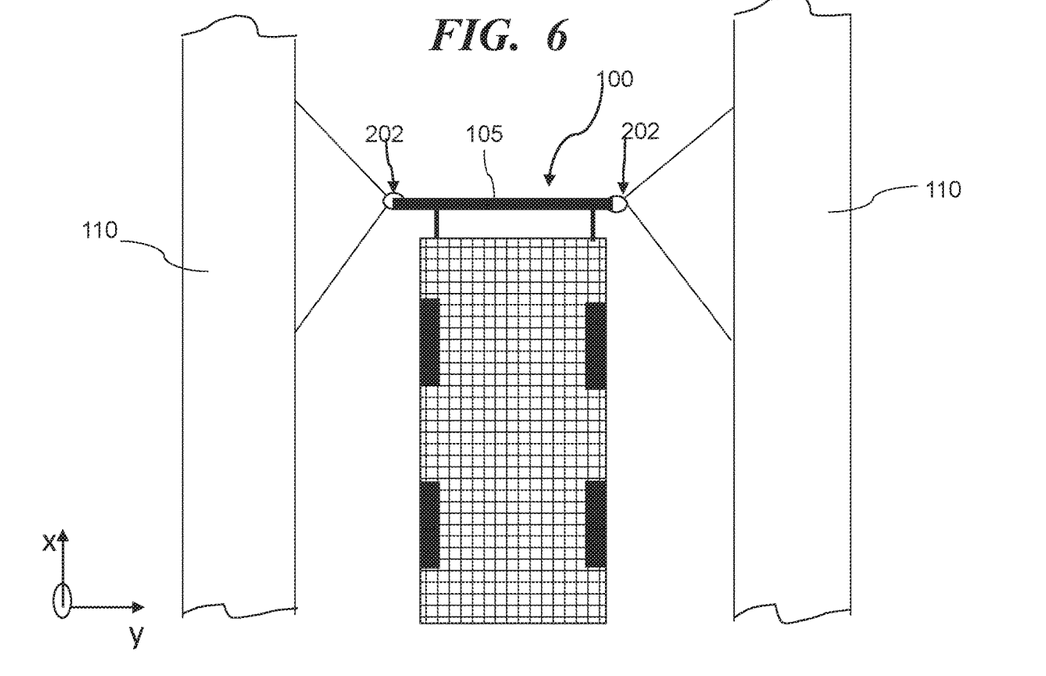
FIGS. 6 and 7 are schematic illustrations of a shopping cart in accordance with some embodiments.
Figure 7:
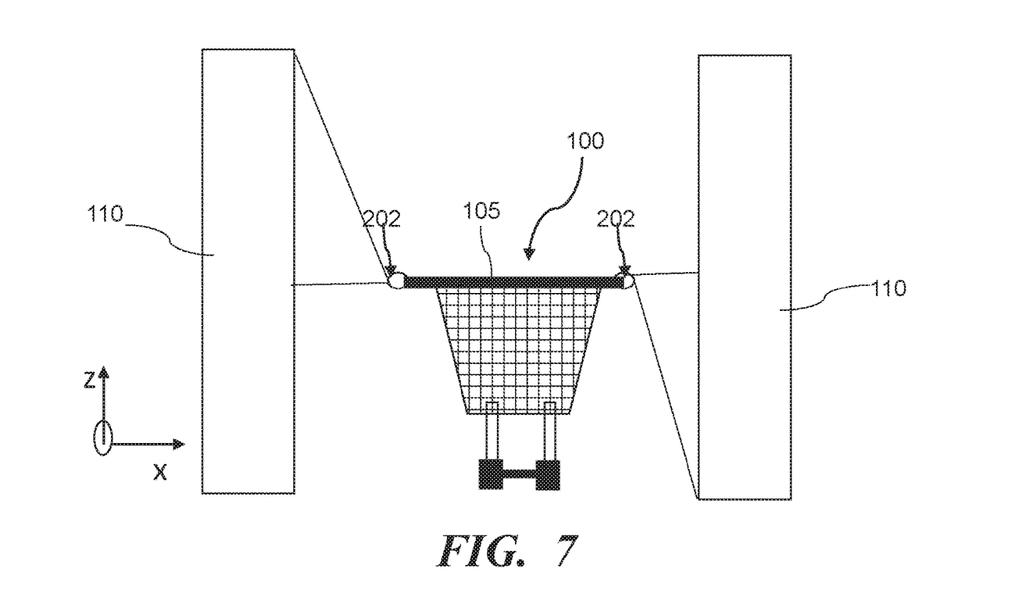

One example, illustrated in FIG. 6, shows an electronic image capturing device 202 disposed on either end of the cart handle 105. Furthermore, the electronic image capturing devices 202 are illustrated capturing images of the shelves 110 by which the cart 100 passes. FIG. 7 illustrates an end view of a shopping cart 100, similar to the cart illustrated in FIG. 6. FIG. 7, however, illustrates how the electronic image capturing devices 202 may not need to obtain wide angle images, such as those available via a fisheye lens, which may require a significant amount of storage space. Instead, the electronic image capturing devices 202 may be angled or calibrated to capture a particular portion or height of the shelves 110.

As mentioned above, the image capturing assembly 108 may include a power storage device 208 configured to store electrical energy sufficient to periodically capture electronic images and store at least some of the electronic images. Also, the image capturing assembly 108, which is mounted onto the shopping cart 100 and pushed around the retail shopping facility 112, is designed to be lightweight and unobtrusive. The image capturing assembly 108 may be incorporated into a cap at the end of a cart handle or snapped onto the cart frame, railing, or handle, such as through a sleeve.

Figure 3:
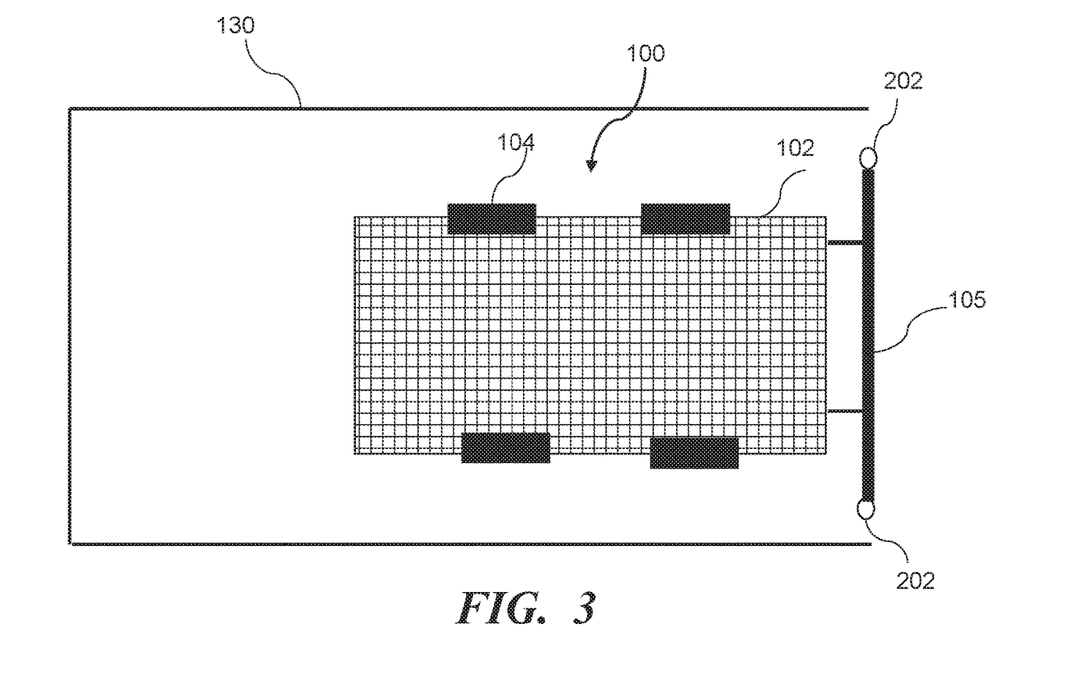
FIG. 3 is a schematic diagram of a shopping cart in accordance with some embodiments.

By one approach, the power storage device 208 remains relatively smaller and lightweight by generating power on board the shopping cart or by frequently charging the device. In one embodiment, the wheel power generator assembly 129 is coupled to at least one of the cart wheels and is configured to generate power. In another embodiment, the power storage device 208 is charged via a direct electrical connection between the shopping cart apparatus 100 and a cart corral 130 (see, FIG. 3). In yet another embodiment, the power storage device 208 is charged via an electrical connection between the shopping cart apparatus 100 and a charging pad 124 at a point of sale terminal 126 (see, FIG. 1) or cart corral. As used herein, a direct electronical connection may include a wire brush connection, a cart extension contact or one of the cart wheels extending within a track, a plug-in connection, and/or docking points between carts or a cart corral.

In one exemplary embodiment, a shopper has their purchases scanned and pays for their purchases at a point of sale terminal 126 within the retail shopping facility. At the point of sale terminal 126, possibly during the transaction(s) between the retail shopping facility and the shopper, the electronic images taken by the image capturing device are taken and communicated to the central computer 120, either directly or indirectly, such as through a network 118.

Another illustrative embodiment, pursuant to these teachings includes a shopping cart 100, an image capturing assembly 108, similar to those discussed above, and a portable electronic device 138. By one approach, the portable electronic device 138 is configured to be operably coupled to the electronic image capturing device 202 and the sensor 206. The portable electronic device 138 may determine when to capture the electronic images based, in part on information from the sensor 206, instruct the electronic image capturing device 202 to capture the electronic images, and store the electronic images.

The portable electronic device 138 may be mounted to the cart frame, railing, or handle. In one illustrative approach, the portable electronic device 138 has battery power and transmission capabilities such that the device 138 may transmit the captured electronic images to the central computer 120. By one approach, the portable electronic device 138 may include, for example, a smartphone or another handheld personal device. Further, in some configurations, the portable electronic device 138 may include the ability to process payment for the retail items within the shopping cart apparatus 100.

The portable electronic device 138 also may have a mobile shopping application or program operating thereon such that the portable electronic device 138 may scan retail items as they are placed into the basket 101. In this manner, the user or customer is able to cross off items on their shopping list while shopping. In one illustrative approach, the portable electronic device 138 is snap fit onto the handle, such that it is easily viewable by a user pushing the shopping cart apparatus 100.

A retail shopping facility 112 may have shelves 110 with retail items 116 disposed thereon and the image capturing device 202 may capture images of the shelves as the shopping cart assemblies 100 are advanced therethrough the aisles of the retail shopping facility. As used herein, aisles may include both the passageway between shelves and the passageway between shelves and other structures.

For example, as illustrated in FIG. 1, as the shopping cart apparatus 100 passes by a shelf 110 an electronic image 901 (see FIG. 9) is captured via the electronic image capturing device 202. The electronic image 901 is communicated to the central computer 120 by the network 118. In another approach, the captured electronic images may be transferred to the central computer 120 via the point of sale terminal 126.

Figure 8:
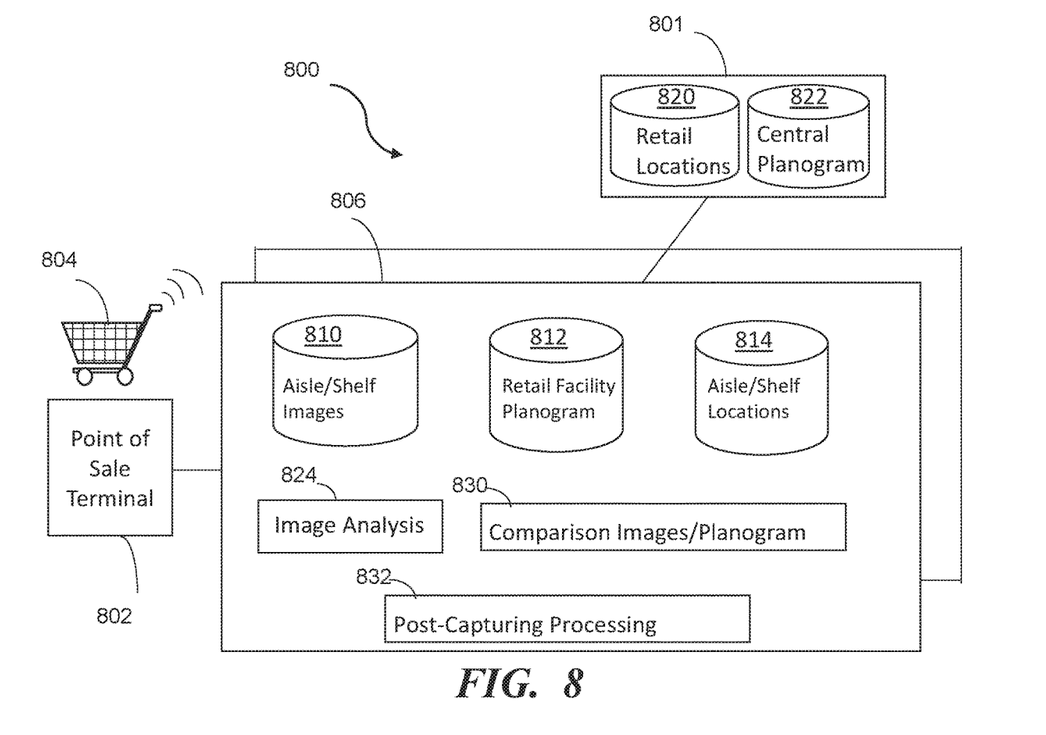
FIG. 8 is an exemplary display system in accordance with some embodiments.

FIG. 8 illustrates one exemplary system 800 with a display server 806 (that may analyze and store information about retail products displayed and/or stocked within the retail shopping facility) and is in communication with a point of sale terminal 802, shopping carts 804, and/or a central planner or headquarters server 801. As suggested above, information about the location of retail products and/or the stock level of shelves may be stored in the display server 806 and may be communicated to headquarters servers 801, which also may be in communication with similar servers from other retail locations.

By one approach, the headquarters server 801 that coordinates with several retail shopping facility may have a database 820 of product locations and stock levels within different retail locations and also a planogram 822 of how the headquarters server 801 intends the retail items to be shelved in the various retail facilities 112. In this manner, the headquarters server 801 can analyze the actual shelf location and stock levels of retail items found in the database 820 and compare it with the planogram 822 to determine how accurately and completely the associates at a given store or retail shopping facility are organizing the facility. Also, the headquarters 801 can analyze the images of a given store's shelves over time to determine how quickly retail items are restocked.

As illustrated in FIG. 8, the display server 806 may include a database of aisle or shelf images 810, a retail shopping facility planogram database 812 that may include images of intended aisle or shelf displays, and a database of aisle or shelf locations of retail items 814. Though display server 806 is illustrated as having these databases within the server 806, these databases also may be stored outside of the server 806 and merely in communication with server 806.

Figure 9:
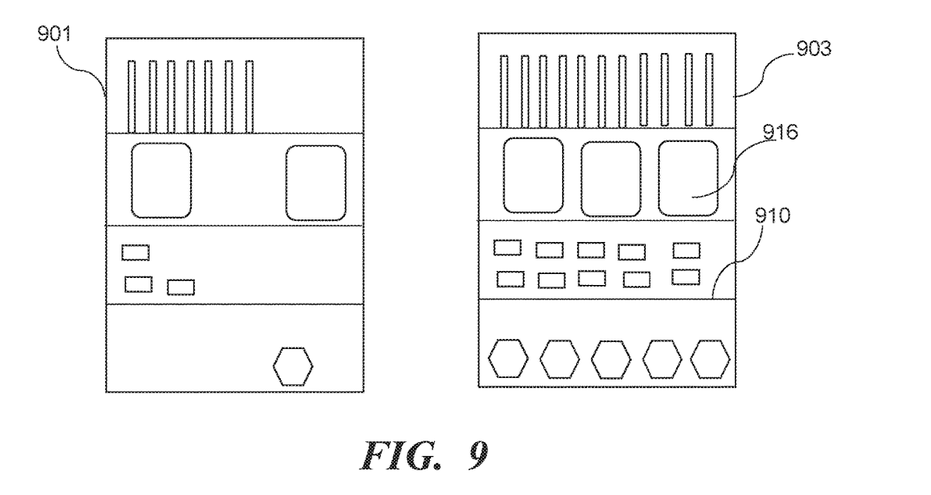
FIG. 9 illustrates an electronic image and a stored planogram image.

In addition to a variety of databases, the display server 806 also may provide image analysis 824, post-capturing processing 832, and analysis or comparison 830 of captured images and the planogram. For example, once the display server 806 has received the electronic images 901, the images may undergo post-capturing analysis or processing 832, such as contrast enhancement or dynamic range reduction. Though display server 806 is illustrated as providing these capabilities, these also may be provided by other servers or devices in communication with the display server 806.

The images captured via the shopping cart 804 also may be used to help determine the path of the shopping cart though the retail shopping facility. This information may be combined with a list of purchased items obtained from the point of sale terminal 802 to verify the shelves of the retail shopping facility that need restocking.

In one illustrative approach, a particular electronic image 901 may be compared with a planogram image 903 stored in the retail shopping facility planogram 812. As illustrated in FIG. 9, retail products 916 are missing from all four shelves 910 of the aisle. Upon detection of the difference between the intended planogram image 903 and the actual captured electronic image 901, the display server 806 or central computer 120 may communicate the discrepancy to the associate electronic device 136. Furthermore, as the system 1000 receives images from numerous shopping carts 100, the display server 806 or the central computer 120 may receive information regarding how long it took the associate (s) to restock the shelves.

Figure 10:
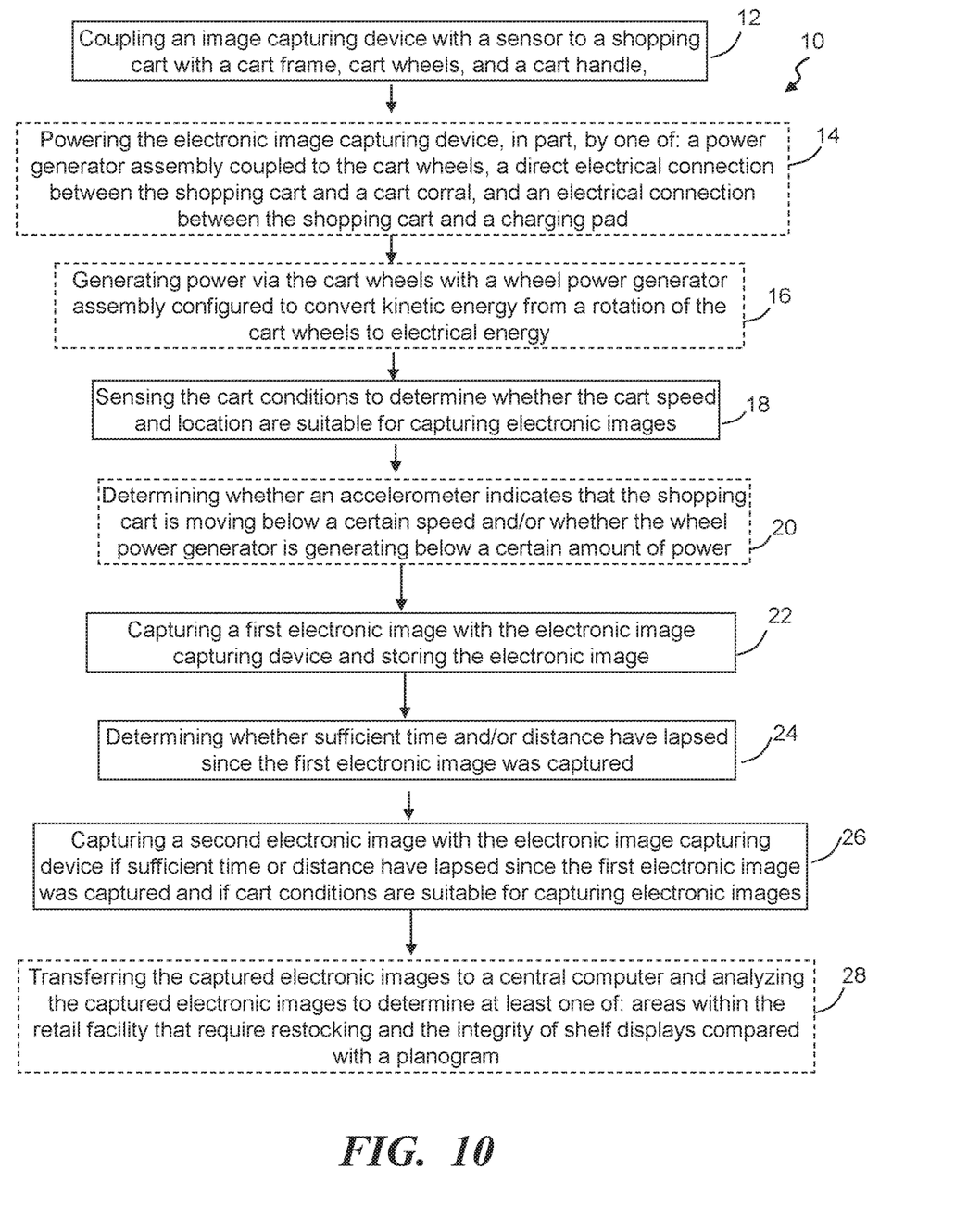
FIG. 10 is a flow diagram of a method in accordance with some embodiments.

Referring now to FIG. 10, a method or process 10 for capturing and analyzing images of shelves within a retail shopping facility according to some embodiments discussed herein is illustrated. The method 10 includes, for example, coupling 12 an image capturing device with a sensor to a shopping cart with a cart frame, cart wheels, and a cart handle and sensing 18 the cart conditions to determine whether the cart speed and location are suitable for capturing an electronic image.

In addition, the process 10 includes capturing 22 a first electronic image with the electronic image capturing device and storing the electronic image, determining 24 whether sufficient time and/or distance have lapsed since the first electronic image was captured, and capturing 26 a second electronic image with the electronic image capturing device if sufficient time and/or distance have lapsed since the first electronic images was captured and if cart conditions are suitable for capturing electronic images.

By one approach, the electronic image capturing device is powered 14, in part, by one of: a power generator assembly coupled to the cart wheels, a direct electrical connection between the shopping cart and a cart corral or point of sale terminal, and an electrical connection between the shopping cart and a charging pad, such as a point of sale terminal or a cart corral. Accordingly, in one embodiment, the process 10 generates 16 power via the cart wheels with a wheel power generator assembly that is configured to convert kinetic energy from a rotation of the cart wheels to electrical energy.

Depending on the sensors incorporated into the shopping cart, the process 10 also may include determining 20 whether an accelerometer indicates that the shopping cart is moving below a certain speed and/or whether a wheel power generator is generating below a certain amount of power.

In step 28, the process 10 may include transferring the captured electronic images to a central computer and analyzing the captured electronic images to determine at least one of: areas within the retail shopping facility that require restocking and the integrity of shelf displays compared with a facility planogram, diagram, or model that indicates the intended or desired placement of the retail products on retail shelves.

Figure 5:
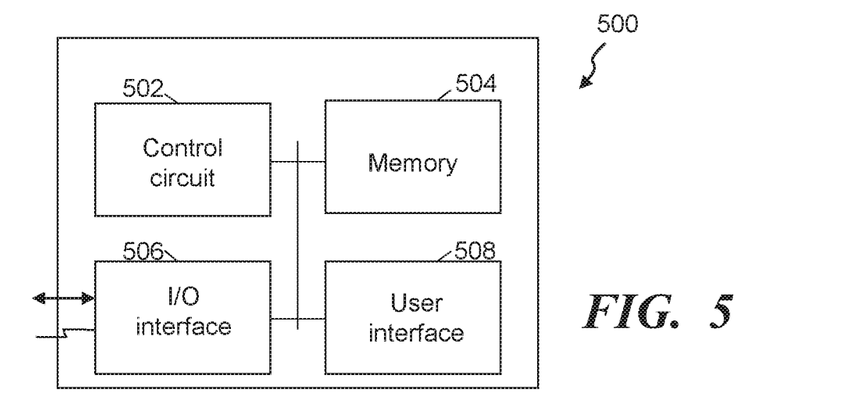
FIG. 5 illustrates an exemplary system for use in implementing systems, apparatuses, devices, methods, techniques and the like in monitoring retail products in a shopping space in accordance with some embodiments.

The methods, techniques, systems, devices, services, servers, sources and the like described herein may be utilized, implemented and/or run on many different types of devices and/or systems. Referring to FIG. 5, there is illustrated a system 500 that may be used for any such implementations, in accordance with some embodiments. One or more components of the system 500 may be used to implement any system, apparatus or device mentioned above or below, or parts of such systems, apparatuses or devices, such as for example any of the above or below mentioned systems, databases, devices, parts thereof, and the like. However, the use of the system 500 or any portion thereof is certainly not required.

By way of example, the system 500 may include one or more control circuits 502, memory 504, and input/output (I/O) devices and/or interfaces 506. Some embodiments further include one or more user interfaces 508. The control circuit 502 typically comprises one or more processors and/or microprocessors. The memory 504 stores the operational code or set of instructions that is executed by the control circuit 502 and/or processor to implement the functionality of the systems and devices described herein, parts thereof, and the like. In some embodiments, the memory 504 may also store some or all of particular data that may be needed to analyze images of store shelves and determine whether restocking is need or whether the store shelves closely resembled the planogram.

It is understood that the control circuit 502 and/or processor may be implemented as one or more processor devices as are well known in the art. Similarly, the memory 504 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 504 is shown as internal to the system 500; however, the memory 504 can be internal, external or a combination of internal and external memory. Additionally, the system typically includes a power supply (not shown), which may be rechargeable, and/or it may receive power from an external source. While FIG. 5 illustrates the various components being coupled together via a bus, it is understood that the various components may actually be coupled to the control circuit 502 and/or one or more other components directly.

Generally, the control circuit 502 and/or electronic components of the system 500 can comprise fixed-purpose hard-wired platforms or can comprise a partially or wholly programmable platform. These architectural options are well known and understood in the art and require no further description here. The system and/or control circuit 502 can be configured (for example, by using corresponding programming as will be well understood by those skilled in the art) to carry out one or more of the steps, actions, and/or functions described herein. In some implementations, the control circuit 502 and the memory 504 may be integrated together, such as in a microcontroller, application specification integrated circuit, field programmable gate array or other such device, or may be separate devices coupled together.

The I/O interface 506 allows wired and/or wireless communication coupling of the system 500 to external components and/or or systems. Typically, the I/O interface 506 provides wired and/or wireless communication (e.g., Wi-Fi, Bluetooth, cellular, RF, and/or other such wireless communication), and may include any known wired and/or wireless interfacing device, circuit and/or connecting device, such as but not limited to one or more transmitter, receiver, transceiver, etc.

The user interface 508 may be used for user input and/or output display. For example, the user interface 508 may include any known input devices, such one or more buttons, knobs, selectors, switches, keys, touch input surfaces, audio input, and/or displays, etc. Additionally, the user interface 508 include one or more output display devices, such as lights, visual indicators, display screens, etc. to convey information to a user, such as but not limited to customer information, shopping lists, available items, requested items, product orders, product information, communication information (e.g., text messages, emails, etc.), status information, notifications, errors, conditions, and/or other such information. Similarly, the user interface 508 in some embodiments may include audio systems that can receive audio commands or requests verbally issued by a user, and/or output audio content, alerts and the like.

In sum, the methods, apparatus, and systems described herein selectively capture images to avoid large in-cart or onboard batteries or other hardware. To that end, these teachings may employ sensors or a combination of sensors to determine when to take images (possibly low resolution images) that likely contain relevant information. By having a low sampling rate and low image resolution, a low-cost and lightweight solution may be provided. For example, the image capturing device may only capture an image if the shopping cart is moving slowly (or stopped) and at a certain focal length from the subject. Further, once a certain amount of time and/or distance has been traveled (and the cart conditions are favorable), another image may be captured. For example, if a shopping cart has moved four feet or fifteen seconds have passed, another image may be captured. Accordingly, no continuous images or video recordings are obtained.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A shopping cart apparatus comprising:
a cart frame with a plurality of cart wheels coupled to the cart frame; and
an image capturing assembly including:
an electronic image capturing device coupled to the cart frame, the electronic image capturing device configured to capture electronic images of shelves within a retail shopping facility, the electronic images usable to indicate a stock level of retail items within the retail shopping facility;
a memory configured to store at least some of the electronic images taken with the electronic image capturing device until the at least some of the electronic images are transferred to a central computer;
at least one sensor configured to measure cart conditions effecting image quality of the electronic images captured by the electronic image capturing device;
a power storage device configured to store electrical energy sufficient to periodically capture electronic images and store the at least some of the electronic images; and
a control circuit operably coupled to the electronic image capturing device, the memory, the at least one sensor, and the power storage device, the control circuit configured to:
determine when to capture the electronic images based, in part, on information from the at least one sensor;
instruct the electronic image capturing device to capture an electronic image; and
store the captured electronic image in the memory;
wherein the control circuit instructs the electronic image capturing device to capture the electronic image when the at least one sensor indicates that the cart frame is within a predetermined distance from one of the shelves and when the shopping cart apparatus is moving below a predetermined speed or the shopping cart apparatus is not moving.

2. The shopping cart apparatus of claim 1 further including a cart handle coupled to the cart frame and configured to be grasped by a user and the electronic image capturing device coupled to the cart handle.

3. The shopping cart apparatus of claim 2 wherein the at least one sensor comprises at least one of:
a proximity sensor configured to determine a current location of the cart frame relative to one of the shelves within the retail shopping facility;
an accelerometer configured to determine cart movement; and
a wheel power generator assembly coupled to at least one of the plurality of cart wheels, the wheel power generator assembly configured to convert kinetic energy from a rotation of the at least one of the plurality of cart wheels to electrical energy.

4. The shopping cart apparatus of claim 3 wherein the control circuit is further configured to transfer the at least some of the electronic images to the central computer and the shopping cart further includes at least one of:
a wireless transceiver to transfer the at least some of the electronic images to the central computer; and
a wired connection configured to transfer the at least some of the electronic images at a cart corral or a point of sale terminal.

5. The shopping cart apparatus of claim 3 wherein the control circuit is configured to capture the electronic images when readings from the at least one sensor are within a predetermined range and a predetermined amount of time or space has passed since a previous electronic image was captured.

6. The shopping cart apparatus of claim 5 wherein the control circuit is configured to capture the electronic image when the proximity sensor indicates that the cart frame is within a predetermined distance from one of the shelves and when at least one of the following occurs:
the accelerometer indicates that the shopping cart apparatus is moving below a certain speed;
the accelerometer indicates that the shopping cart apparatus is not moving;
the wheel power generator assembly is generating power below a certain amount; and
the wheel power generator assembly is not generating power.

7. The shopping cart apparatus of claim 3 wherein the proximity sensor is disposed at a lower portion of the cart frame or is disposed at the cart handle.

8. The shopping cart apparatus of claim 3 wherein the power storage device is charged via at least one of:
the wheel power generator assembly coupled to at least one of the plurality of cart wheels;
a direct electrical connection between the shopping cart apparatus and a cart corral; and
an electrical connection between the shopping cart apparatus and a charging pad at a point of sale terminal.

9. The shopping cart apparatus of claim 8 wherein the direct electrical connection between the shopping cart apparatus and the cart corral includes at least one of a wire brush connection, a cart extension contact or one of the cart wheels extending within a track, and a plug-in connection.

10. A shopping cart apparatus comprising:
a cart frame with a plurality of cart wheels coupled to a lower portion thereof; and
an image capturing assembly including:
an electronic image capturing device associated with the cart frame, the electronic image capturing device configured to capture electronic images of shelves within a retail shopping facility;
at least one sensor configured to measure cart conditions effecting image quality of the electronic images captured by the electronic image capturing device; and
a portable electronic device configured to be operably coupled to the electronic image capturing device and the at least one sensor, the portable electronic device configured to determine when to capture the electronic images based, in part, on information from the at least one sensor, instruct the electronic image capturing device to capture the electronic images; and store the electronic image;
wherein the portable electronic device instructs the electronic image capturing device to capture an electronic image when the at least one sensor indicates that the cart frame is within a predetermined distance from one of the shelves and when the shopping cart apparatus is moving below a predetermined speed or the shopping cart apparatus is not moving.

11. The shopping cart apparatus of claim 10 wherein the portable electronic device has battery power and transmission capabilities.

12. The shopping cart apparatus of claim 10 wherein the portable electronic device is mountable to the cart frame.

13. A method of obtaining electronic images comprising:
coupling an image capturing assembly to a shopping cart, the shopping cart having a cart frame, a plurality of cart wheels, and a cart handle, the image capturing device having an electronic image capturing device associated with the cart frame and at least one sensor configured to measure cart conditions;
capturing a first electronic image with the electronic image capturing device and storing the electronic image;
sensing the cart conditions to determine whether cart speed and location are suitable for capturing electronic images;
determining whether sufficient time or distance have lapsed since the first electronic image is captured; and
capturing a second electronic image if sufficient time or distance have lapsed and if cart conditions are suitable for capturing electronic images;
wherein the step of sensing the cart conditions includes determining whether the accelerometer indicates that the shopping cart is moving below a certain speed and whether the wheel power generator is generating below a certain amount of power.

14. The method of claim 13 further comprising transferring the captured electronic images to a central computer and analyzing the captured electronic images to determine at least one of: areas within the retail shopping facility requiring restocking; and integrity of shelf displays compared with a planogram.

15. The method of claim 13 further comprising generating power via at least one of the plurality of cart wheels with a wheel power generator assembly configured to convert kinetic energy from a rotation of the at least one of the plurality of cart wheels to electrical energy.

16. The method of claim 13 further comprising powering the electronic image capturing assembly, in part, by at least one of: a wheel power generator assembly coupled to one of the plurality of cart wheels, a direct electrical connection between the shopping cart and a cart corral, and an electrical connection between the shopping cart and a charging pad at a point of sale terminal.

17. The method of claim 13 further comprising processing captured images via image contrast enhancement or dynamic range reduction.

* * * * *